Feb. 11, 1947.  C. M. OSTERHELD  2,415,524
THERMAL RETARDER
Filed Sept. 20, 1944  2 Sheets-Sheet 2
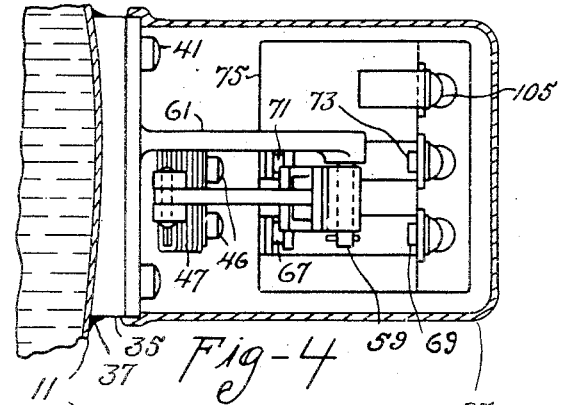
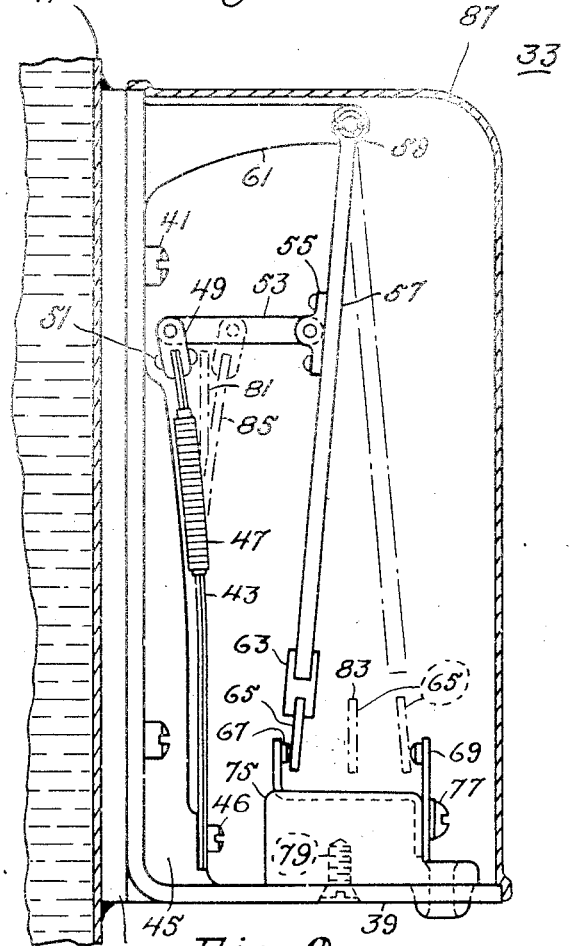
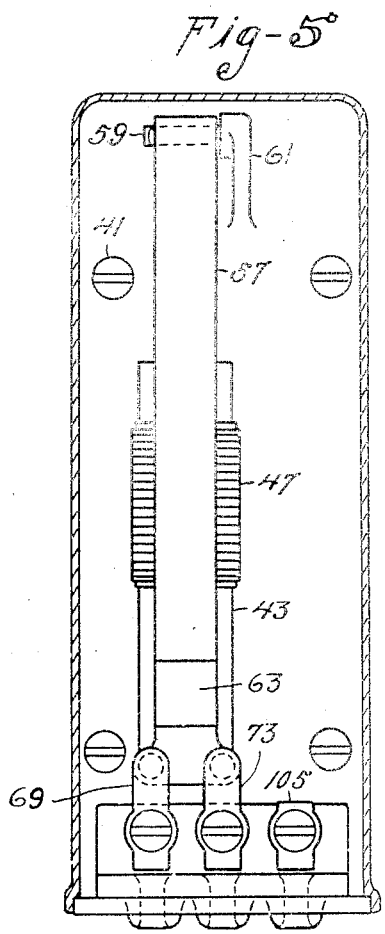
INVENTOR.
CLARK M. OSTERHELD
BY
ATTORNEY Patented Feb. 11, 1947

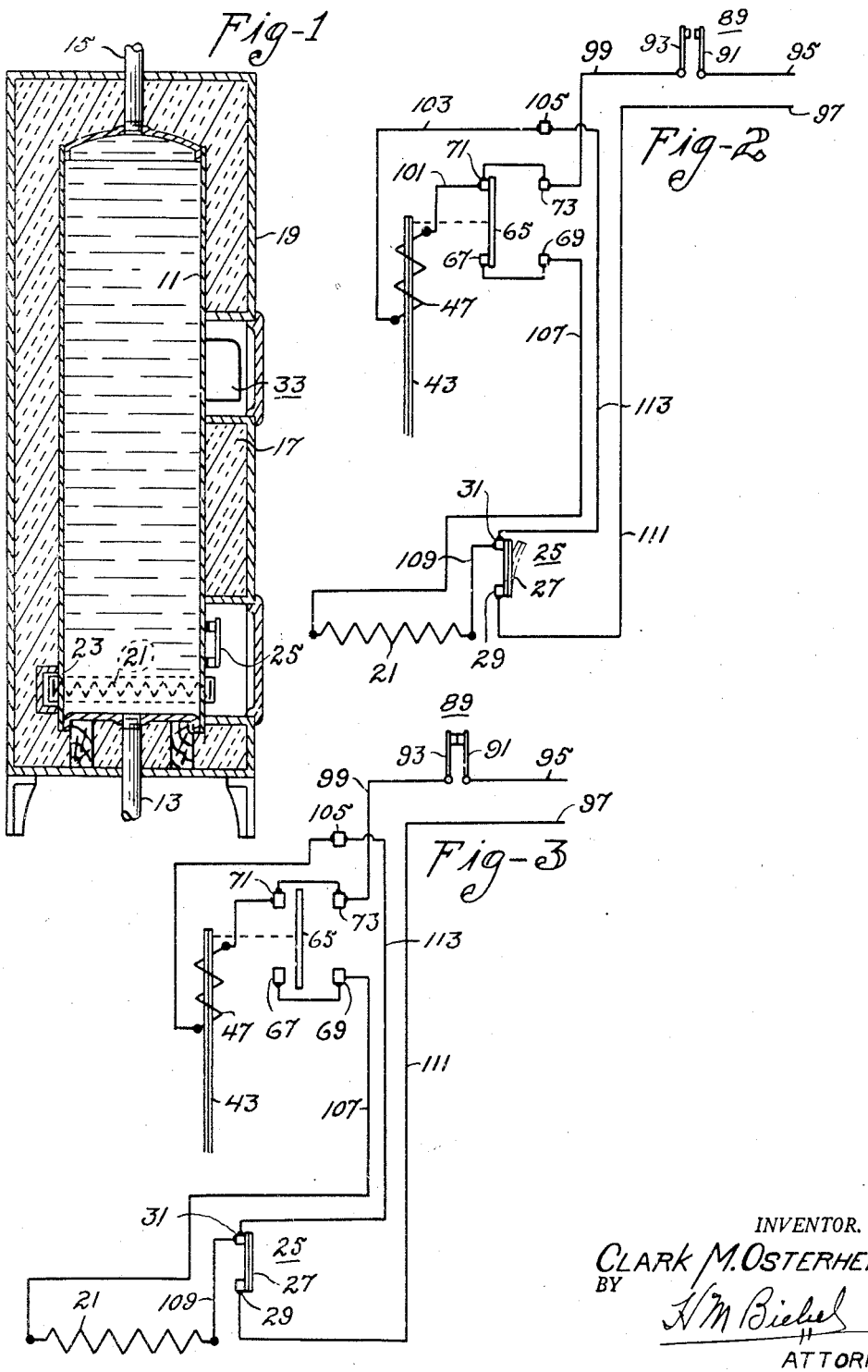

2,415,524

UNITED STATES PATENT OFFICE 2,415,524

THERMAL RETARDER

Clark M. Osterheld, Stoughton, Wis., assignor to McGraw Electric Company, Elgin, Ill., a corporation of Delaware Application September 20, 1944, Serial No. 555,002

7 Claims. (Cl. 219—39)

My invention relates to electric heater control devices and particularly to thermal retarder heater control switch units.

An object of my invention is to provide a relatively simple, inexpensive, and easily manufactured thermal retarder to selectively cause immediate energization of the electric heater of a domestic hot water tank or energization of the heater with a predetermined time period of delay, in accordance with the amount of cold water in the tank at the start of an off-peak period.

In the drawings,

Figure 1 is a vertical, sectional view of a domestic hot water tank, having associated therewith a thermal retarder shown in Figs. 4 to 6 of the drawings, Fig. 2 is a diagram of the circuits, showing the contacts in the position when the tank is either entirely full of cold water or is at least half full of cold water, and with the off-peak time switch open, Fig. 3 is a diagram substantially the same as Fig. 2, except that the contacts are shown in the position as when the tank is more than half full of hot water and the time switch is closed, Fig. 4 is a top plan view of the device shown in Fig. 6, with the cover shown in section, Fig. 5 is a front view of the device shown in Fig. 6, with the cover shown in section, and Fig. 6 is a view in side elevation of the thermal retarder control switch, with the cover shown in section.

Referring first of all to Fig. 1 of the drawings, I have there shown an ordinary domestic hot water tank 11, having a lower cold water inlet pipe 13, an upper hot water outlet pipe 15, the tank having a mass 17 of heat-insulating material therearound, which heat-insulating material is held in proper operative position on the tank by an outer casing 19.

I provide preferably, but not necessarily, a single electric heater 21, which, if only a single heater is provided, is positioned around the tank adjacent the lower end portion thereof and which may be located in a tunnel member 23.

It may be here pointed out that the above described details of the tank and of the electric heater are no part of my present invention, but are already well known in the art.

I provide further a lower thermally-actuable heater control switch, designated generally by numeral 25; and while I have shown specific details of a switch 25, I do not desire to be limited thereto, since any similar switch, operative for the same general purposes, now well known in the art, may be used in place thereof. Switch 25 comprises a bimetal bar 27, having one end thereof secured to a contact member 29, while its other end is adapted to engage with and be disengaged from a fixed contact member 31, the two contact members 29 and 31 being adapted to be mounted in heat-receiving relation on the outside of tank 11 adjacent the lower end portion of the tank. The design, construction, and adjustment of the thermal switch 25, in whatever form it may be used, is such that when subject to cold water in the tank it will be in closed position, that is bimetal bar 27 will be in engagement with contact 31, while if subject to hot water in the tank, bimetal bar will be out of engagement with fixed contact 31, as shown in the broken lines of Fig. 2 of the drawings. When I refer to cold water, I mean water the temperature of which is on the order of 60° F. to 70° F., while if I refer to hot water, I mean water the temperature of which is on the order of 150° F., or slightly higher.

I provide also a thermal retarder, which I have designated by numeral 33 in its entirety and which is preferably, but not necessarily, positioned in heat-receiving relation on tank 11 at substantially the mid-height of the tank.

The thermal retarder heater control switch unit 33 comprises a supporting block 35, the inner face of which is of arcuate shape, so that substantially all of the inner surface of supporting block 35 will be in engagement with the outer arcuate surface of the tank 11, I may provide a plurality of welding seams 37 to secure block 35 against the outer surface of tank 11 at the desired position thereon.

The switch unit includes further a supporting bracket 39, which is shown as being of substantially L-shape, one leg thereof, namely the vertical one, being adapted to be secured against the outer face of supporting block 35 by a plurality of short machine screws 41. It may be here pointed out that block 35 and bracket 39 are made of a heat-conducting material so that a bimetal bar 43 secured thereto may be in good heat-receiving relation to the water in the tank. The lower end portion of the creep-type bimetal bar 43 is secured by screws 46 to the lower end of a projection 45, constituting a part of bracket 39 and particularly of its vertically-extending leg portion.

I provide further a small heating coil 47, which is insulatedly mounted on the bimetal bar 43 at its upper free end. The amount of electric energy transformed into heat in coil 47 is on the order of only a relatively few watts and is such as to cause a predetermined temperature rise of particularly the outer free movable end of bimetal bar 43 under operating conditions as will be hereinafter set forth.

I provide a pivot block 49 which is fixedly secured to the upper end of bimetal bar 43 as by a rivet or rivets 51, a link 53 having one end pivotally connected with member 49. The other end of link 53 is pivotally connected to a pivot bearing 55 which is fixedly mounted intermediate the ends of a lever arm 57, the upper end of which lever arm is pivotally supported as by a pivot pin 59 mounted on a supporting bracket 61, the inner end of which is either integral with bracket 39 or is suitably secured thereto in any manner well known in the art.

I provide a block 63 of electric-insulating material which is secured to the lower end of lever arm 57 and which supports a contact bridging member 65 therein. While I have not shown any securing means for holding the block 63 on the lower end of lever arm 57, nor any means for securing and holding the contact bridging member 65 in block 63, any suitable or desired securing means may be used.

I provide two pairs of spaced, fixed contacts 67 and 69 and 71 and 73, which are mounted on a block 75 of electric-insulating material by screws 77, block 75 being secured against the upper surface of the horizontal leg portion of bracket 39 as by short machine screws 79. Contacts 67 and 69 are connected to each other, as are also 71 and 73.

The design, construction, and adjustment of the creep-type bimetal bar 43 are such that when the thermal retarder heater control switch unit is subject to cold water in the tank, the bimetal bar will be in the position shown in full lines in Fig. 6 of the drawings, that is it will have flexed in a counter-clockwise direction, with the result that lever arm 57 will have been turned in a clockwise direction, so that bridging member 65 will be in engagement with fixed contact members 67 and 71. When the bimetal bar 43 is subject to hot water in the tank, it will flex in a clockwise direction and occupy the position designated by numeral 81 in Fig. 6 of the drawings, with the result that contact bridging member 65 will have been moved to the position designated by numeral 83, that is out of engagement with either pair of contacts. However, when heating coil 47 has been energized for at least a predetermined period of time on the order of four hours, to cause temperature rise of particularly the upper movable end portion of bimetal bar 43, this temperature being on the order of 250° F., bimetal bar 43 will have flexed further in a clockwise direction, with the result that it will occupy the position designated by numeral 85 and show in broken lines in Fig. 6 of the drawings. This will have the result that contact bridging member 65 will have been moved further in a counter-clockwise direction, so that it will now be in engagement with the pair of contacts 69 and 73. The difference of temperature to which the bimetal bar is subjected, namely, from 70° F. to 150° F., is relatively large, so that I may provide any means now well known in the art to ensure that the contact bridging member 65 will remain in engagement with contacts 67 and 71, while the temperature thereof increases from say 70° F. to 150° F., at which latter temperature disengagement of the contact bridging member 65 from fixed contacts 67 and 71 will take place, as hereinbefore described. The same comments will hold with regard to the movement of contact bridging member 65 into engagement with contacts 69 and 73, when the temperature of at least the upper end portion of bimetal bar 43 has been raised to a value on the order of 250° F. These means may comprise a spring bar connected to a shortened lever arm 57 and to block 63 of electric-insulating material, or it may comprise a permanent magnet adapted to hold the lever arm 57 in the position shown in full lines in Fig. 6 of the drawings. A cover 87 is also provided for the thermal retarder 33.

Referring now particularly to Fig. 2 of the drawings, I have there illustrated a diagram of connections used with my improved form of thermal retarder unit. I provide a time controlled switch, designated generally by numeral 89, comprising two contact arms 91 and 93, which are adapted to be controlled by any suitable continuously-operative timing means, so that the contact arms will be out of engagement with each other during all on-peak periods, while they will be in engagement with each other during all off-peak periods. I provide further two supply circuit conductors 95 and 97, of which supply circuit conductor 95 is connected to contact arm 91. A conductor 99 connects contact arm 93 with fixed contact 73 which is connected to contact 71. Contacts 71 and 73 are connected by a conductor 101 to one terminal of heating coil 47, the other terminal of which is connected by a conductor 103 to a contact terminal 105, also secured to and mounted on block 75 hereinabove described. Fixed contacts 67 and 69 are also electrically connected and are connected by a conductor 107 to one terminal of heater 21, the other terminal of which is connected by a conductor 109 to fixed contact 31. Fixed contact 29 of the lower thermal switch 25 is connected by a conductor 111 to the second supply circuit conductor 97. Fixed contact 31 is connected by a conductor 113 to contact terminal 105.

Let it now be assumed that a relatively small amount of hot water has been withdrawn from the tank during the on-peak period, say in the early evening, so that the lower thermally-actuable switch 25 is subject to cold water, but the thermal retarder switch unit is subject to hot water. In this case, the contact bridging member 65 will have been moved into the position shown in the diagram of Fig. 3, that is no energizing circuit will be provided for the heater 21. At the start of an off-peak period, the time-controlled switch 89 will be moved to closed position, as is shown in Fig. 3, with the result that an energizing circuit, through heating coil 47, is closed, with the attendant result of rise of temperature of the upper end portion of bimetal bar 43 in a predetermined length of time, which may be on the order of four hours, at the end of which time bimetal bar 43 will have moved contact bridging member 65 into engagement with contacts 69 and 73, resulting in energizing the heater 21 through a circuit as follows: from supply circuit conductor 95, through closed switch 89, conductor 99, engaged contacts 73, 69, and bridging member 65, conductor 107, heater 21, conductor 109, closed switch 25, and conductor 111 to the other supply circuit conductor 97. The energized heater 21 will cause temperature rise of the cold water in the lower part of tank 11, and this energization will continue until substantially all of the water in the tank is hot; and if this happens before the end of the off-peak period, the heater 21 and the heating coil 47 will be deenergized by opening of the lower thermally-actuable switch 25. If, however, for some reason, such as the withdrawal of additional hot water from the tank during the last few hours of an off-peak period, less than all of the water in the tank is hot at the end of an off-peak period, deenergization of heater 21 will be effected by opening of the time-controlled switch 89 at the end of an off-peak period.

Let it now be assumed that a relatively large quantity of hot water was withdrawn from the tank during say early evening hours, the bimetal bar 43 being then subject to cold water, with the attendant result of its movement into substantially the position shown in full lines in Fig. 6 and as shown in Fig. 2.

Energization of the heater 21 will occur immediately upon closure of the time-controlled switch 89 at the start of an off-peak period, which may be considered to be 10 p. m. or 11 p. m. The larger quantity of cold water in the tank will then be heated gradually, because of the energization of heater 21, until the thermal retarder 33 is subject to hot water, when the energizing circuit is opened as shown in Fig. 3. After several hours the energized heating coil 47 will cause flexing of bimetal bar 43 to position 85 with attendant movement of bridging member 65 into engagement with contacts 69 and 73 and reenergization of heater 21; and if less than all of the water in the tank is hot at the end of an off-peak period, opening of time-controlled switch 89 will deenergize the heater 21, while if substantially all of the water in the tank is hot before opening of the time-controlled switch, deenergization of heater 21 will be effected by the lower thermally-actuable switch 25.

The thermal retarder heater control switch unit disclosed in the present application is therefore effective to cause either immediate energization of the heater upon start of an off-peak period and closure of a time-controlled heater control switch, in case say more than half of the tank is filled with cold water or to cause energization of the heater with a predetermined time period of delay in case only a relatively small quantity of cold water is in particularly the lower portion of the tank.

Various modifications may be made in the device embodying my invention without departing from the spirit and scope thereof, and all such modifications clearly coming within the scope of the appended claims shall be considered as part of my invention.

I claim as my invention:

1. A thermal retarder heater control switch unit for a domestic hot water tank heater, comprising a creep-type bimetal bar having one end adapted to be mounted in heat-receiving relation to water in a tank, a heating coil for the other end of said bar, a lever arm having one end thereof pivotally fixed and having a switch member on its other end, a pair of spaced fixed contacts and a pivotal connecting link between the free end of the bimetal bar and the lever arm intermediate its ends to cause said switch member to engage one of said fixed contacts when the bimetal bar is subject to cold water in the tank, to cause said switch member to be out of engagement with said fixed contacts and therebetween when the bimetal bar is subject to hot water in the tank and to cause said switch member to be in engagement with the other fixed contact when the free end of the bimetal bar is at an appreciably higher temperature.

2. A thermal retarder switch unit for controlling the circuit of a domestic hot water tank heater, comprising a single bimetal bar subject to tank water temperature, a switch lever arm pivotally supported at one end and carrying a switch member at its other end, spaced fixed contacts selectively engageable by said switch member, a link pivotally connecting said bimetal bar and said lever arm and a heating coil on said bimetal bar, said bimetal bar being effective to selectively cause immediate closure of the heater circuit when subject to cold water in the tank and to cause closure of the heater circuit with a predetermined time period of delay when the free end of the bimetal bar is subject to a temperature appreciably higher than that of hot water caused by said heating coil.

3. A thermal retarder heater control switch unit for a domestic hot water tank heater, comprising a creep-type bimetal bar having one end thereof mounted in heat-receiving relation on a tank, a fixed pivot point, a switch arm having one end mounted on said pivot point and pivotally connected intermediate its ends with the free end of the bimetal bar, fixed spaced contacts adapted to be selectively engaged by said switch arm when the temperature of the free end of said bimetal bar is at a predetermined low and at a predetermined high value and to be disengaged therefrom when at a predetermined intermediate value and a heating coil on the other end of the bimetal bar to raise the temperature of the free end of the bar to said predetermined high value.

4. A thermal retarder heater control switch unit for a domestic hot water tank heater, comprising a single bimetal bar having one end thereof mounted in heat-receiving relation on a tank, a fixed pivot point, a switch arm having one end mounted on said pivot point and pivotally connected intermediate its ends with the free end of the bimetal bar, fixed spaced contacts adapted to be selectively engaged by said switch arm when the temperature of the free end of said bimetal bar is substantially that of cold water in the tank and appreciably higher than that of hot water in the tank and to be disengaged therefrom when said temperature is substantially that of hot water in the tank and a heating coil on the free end of the bimetal bar to raise the temperature thereof to said appreciably higher value.

5. A thermal retarder heater control switch unit for a domestic hot water tank heater, comprising a single bimetal bar having one end adapted to be mounted in heat-receiving relation to water in a tank, a heating coil for the other end of said bar, a lever arm having one end thereof pivotally fixed and having a switch member on its other end, a pair of spaced fixed contacts and a pivotal connecting link between the free end of the bimetal bar and the lever arm intermediate its ends to cause said switch member to engage one of said fixed contacts immediately upon the bimetal bar becoming subject to cold water in the tank, to cause said switch member to move out of engagement with said fixed contacts and therebetween when the bimetal bar is subject to hot water in the tank and to cause said switch member to move into engagement with the other fixed contact with a predetermined time period of delay after energization of the heating coil.

6. A thermal retarder heater control switch unit for a domestic hot water tank heater, comprising a single relatively long creep-type bimetal bar having one end adapted to be mounted on a tank, a lever arm pivotally mounted at one of its ends, a link pivotally connected with the other end of said bimetal bar and with an intermediate point on said lever arm, two pairs of electrically connected fixed contacts, a contact bridging member mounted at the other end of said lever arm and a heating coil on the other end of said bimetal bar, said contact bridging member being in engagement with two of said fixed contacts when the temperature of said bimetal bar is at a relatively low value and in engagement with the other two fixed contacts when the temperature of said bimetal bar is at a relatively high value.

7. A thermal retarder heater control switch unit for a domestic hot water tank heater, comprising a single relatively long creep-type bimetal bar having one end adapted to be mounted on a tank, a lever arm pivotally mounted at one of its ends, a link pivotally connected with the other end of said bimetal bar and with an intermediate point on said lever arm, two pairs of electrically connected fixed contacts, a contact bridging member mounted at the other end of said lever arm and a heating coil on the other end of said bimetal bar, said contact bridging member being in engagement with two of said fixed contacts when the temperature of said bimetal bar is at a relatively low value to energize said heater out of engagement with said fixed contacts when the temperature of said bimetal bar is at an intermediate value to deenergize said heater to be in engagement with said other two fixed contacts when the temperature of said bimetal bar is at a relatively high value to reenergize said heater.

CLARK M. OSTERHELD.

REFERENCES CITED

The following references are of record in the file of this patent:

UNITED STATES PATENTS

| Number | Name | Date |
|---|---|---|
| 2,175,827 | Conklin | Oct. 10, 1939 |